United States Patent Office 3,455,850
Patented July 15, 1969

3,455,850
FIRE-RESISTANT POLYURETHANE FOAM
James H. Saunders, Bridgeville, Pa., assignor to Mobay Chemical Company, Pittsburgh, Pa., a corporation of Delaware
No Drawing. Filed Mar. 2, 1966, Ser. No. 531,044
Int. Cl. C09k 3/28; C08g 22/44
U.S. Cl. 260—2.5                                8 Claims

ABSTRACT OF THE DISCLOSURE

Use of a flame-resistant porous filler coated with an intumescent material, for example, vermiculite coated with ammonium phosphate, to provide a polyurethane foam of improved flame resistance.

---

This invention relates to flame retardant polyurethane foams and more particularly to polyurethane foams containing a filler which promotes improved resistance to burning.

Heretofore it has been proposed to include expanded vermiculite in polyurethane foams because it has a low density and consequently less tendency to become isolated in one section of the foaming mass. It is very desirable to use expanded vermiculite because it can be dispersed in the foam without special equipment. However, the porous surface of the expanded vermiculite absorbs some of the foaming ingredients and causes densification of the composite product. Still further, while the porous vermiculite itself is resistant to burning, the foamed polyurethane polymer which exists in the interstices between particles of vermiculite and surrounding the particles of vermiculite is flammable so that it will not pass certain building inspection codes.

It has also been proposed heretofore to include inorganic potentially intumescent materials in the polyurethane foam to improve the foam's ability to resist fire. Thus, for example, it is proposed in Canadian Patent 705,937 to put materials which will intumesce into polyurethane foam by including the potentially intumescent material in the foam mixture. In such a process the addition of flame resisting amounts of the potentially intumescent material unduly increases the density of the product and uses far too much of the potentially intumescent material for good foam properties. For example, water absorption and moisture vapor permeability are usually greatly increased and foams tend to be dimensionally unstable.

It is therefore an object of this invention to provide improved polyurethane foams containing a filler and a potentially intumescent material. Another object of this invention is to provide polyurethane foams having improved flame resistance. Still a further object of this invention is to provide an improved polyurethane foam structure containing an inert porous filler. A further object of this invention is to provide a process for preparing improved flame resistant polyurethane foams. Still another object of this invention is to provide a way of simultaneously avoiding the problems associated with the use of porous fillers and potentially intumescent flame resisting agents in polyurethane foams. A further object of this invention is to provide for improved filler-flame resisting agent for polyurethane foams.

The foregoing objects and others which will become apparent from the following description are accomplished in accordance with the invention, generally speaking, by providing flame resisting polyurethane plastics which contain a porous filler which acts as a carrier for a flame resisting potentially intumescent material. Thus, this invention provides for the production of polyurethane foams wherein a porous filler is included which has been previously treated with flame resisting potentially intumescent material. It is, therefore, a critical feature of the present invention that certain amounts of filler bearing the potentially intumescent material be included in the improved polyurethane plastics. The amount of filler is required to be such that the filler particles are spaced apart a distance slightly less than the thickness of the intumescent char coating formed after the surface of the foam has been subjected to a flame. The preferred fillers are those which do not readily burn even without treatment.

The invention provides for the production of polyurethane foam where at least the surface of the foam, and preferably a sufficient amount of underlying surface to avoid having the flame penetrate to the interior unprotected area, contains a porous, substantially nonflammable filler which has a coating of potentially intumescent material on the filler and the particles of the filler are spaced apart along the surface of the foam and the area immediately underlying the surface in such a way that when the surface of the foam comes in contact with high heat or a flame, the coatings intumesce and form a stable char between the preferably nonflammable filler particles. It is essential to the invention that the filler particles be coated with the potentially intumescent material; that the filter particles themselves be substantially nonflammable and that they be embedded in the foam at least on the surface and preferably extend an inch to two inches below the surface in such a relationship with each other that when the surface of the foam is subjected to a flame, the coating will intumesce and the surface will form a stable char which functions as a protective surface layer that the flame cannot penetrate, thus causing it to burst away as has been the case with previous foams coated with a potentially intumescent material.

In order to insure that the coatings are of the most protective type, it is preferred that the filler particle size vary from only about 0.1 inch to about 1 inch, that they be of relatively uniform size within this range, and that the gaps or spaces between the particles be a maximum of from about 0.02 to about 0.2 inch.

The invention provides for more than just improved resistance to flame. It has also been found that the combination of the potentially intumescent material with the filler leads to an improved polyurethane foam as explained above. Heretofore, the expanded vermiculite filler absorbed some of the liquid components of the polyurethane plastic. The absorption of the liquid foaming components by the vermiculite leads to densification of the polyurethane polymer around the porous vermiculite particles. The density of the filled foam is therefore not uniform in the prior are materials. A more serious difficulty with the prior art method is that excess polymer forming components are required in order to obtain the same overall volume of filled foam. The present invention avoids this difficulty in an efficient and economical way. In the present invention the potentially intumescent material becomes absorbed on the surface of the porous filler before it is contacted by the liquid polyurethane forming ingredients. The pores at the surface of the filler are therefore occluded to prevent absorption of liquid foam components and yet the potentially intumescent material is in the ideal location on the surface of the filler to form its later fire resisting function in the event that it becomes necessary. After all, most flame resisting agents are included in a polyurethane foam as insurance only. They never perform a useful function unless the foam is subjected to a flame. This invention provides utility for the flame resisting agent whether or not the foam is ever subjected to flame.

It is not necessary that the coated nonporous filler be dispersed throughout the foam. It is possible to only protect the exposed surfaces of the foam with the porous substantially nonflammable filler which contains a potentially intumescent material coated thereon. For example, it has been proposed heretofore to insulate the interior walls of buildings by spraying the superstructure on the inside with rigid polyurethane foam. When following this old process but utilizing the foam of the present invention, one could begin with several layers of rigid polyurethane foam sprayed onto the superstructure to build up an insulating layer, and then when within a couple of inches of the desired thickness make a pass or two with a spray gun which sprays on a mixture of polyurethane foam and the filler which had been coated with a potentially intumescent material. The coated filler is preferably sprayed simultaneously with the last spray application of foam, or on top of the partially expanded foam immediately so that the rising foam contains filler particles embedded to a depth preferably of at least 0.25 to about 1 inch below the surface. There are many alternate ways of using the filled polyurethane foam of the present invention. One may make loaves of polyurethane foam which contain the intumescent bearing porous filler either throughout or only on the surface and then use these as a flame resisting wall either in buildings or as a self-supporting partition. Still further, it is often desirable to seal off unused mine shafts in order to avoid the escape of noxious gases and in order to provide for fire and explosion proof barriers utilizing the foam of the invention. This can be done with either the preformed foam or by spraying the foam onto a thin supporting wall in order to seal off the shaft.

The polyurethane foam of the invention may be any suitable heretofore known polyurethane foam prepared by reacting, in the presence of a blowing agent, an organic polyisocyanate with an organic compound containing active hydrogen containing groups as determined by the Zerewitinoff method. The conventional catalysts, foam stabilizers and other additives may be used. A foam classed as self-extinguishing is preferred, i.e. a foam based on at least one component containing sufficient phosphorous, halogen or the like to make the foam per se self extinguishing.

Any suitable porous filler which itself is substantially nonflammable and which preferably is of substantially uniform particle size may be used such as, for example, expanded vermiculite, foamed clays, foamed glass, phenolic foam and the like. It is preferred to use expanded fillers, such as expanded vermiculite, which have a low conductivity and thus when used on the surface of a body of foam will not conduct the heat to the underlying unprotected areas.

The porous filler is treated with a potentially intumescent material, i.e. one which will intumesce to form a stable char when subjected to flame or intense heat, such as ammonium phosphate, ammonium polyphosphates, such as $(NH_4)_2H_2P_2O_6$ and the like, magnesium sulfate, zinc chloride, alkali lactatozirconylates, such as sodium or potassium lactatozirconylates, antimony compounds such as antimony trioxide, but preferably not trivalent antimony compounds which are highly poisonous; sodium tungstate, sulfamates such as cadmium, cobalt, copper and nickel sulfamate, red phosphorus, borax, guanidine phosphate, ammonium sulfate, ammonium chloride, boric acid, sodium arsenate and sodium arsenite (which can only be used where their poisonous properties are of no consequence), urea derivatives such as the reaction product of urea and phosphoric acid, and the like. The potentially intumescent material is preferably applied to the porous filler as a solution so that a coating results on the filler which seals the surface and thereby avoids subsequent densification of the foam forming mixture on the filler in the subsequent foam to formation. The porous filler preferably has a bulk density below about 20 lbs./ft.$^3$ preferably in the range of 1.5 to about 10 lbs./ft.$^3$.

Any suitable organic compound containing at least two active hydrogen containing groups as determined by the Zerewitinoff method, said groups being reactive with an isocyanate group, may be reacted with an organic polyisocyanate in accordance with the process of the present invention. The active hydrogen atoms are usually attached to oxygen, nitrogen or sulfur atoms. Thus, suitable active hydrogen containing groups as determined by the Zerewitinoff method which are reactive with an isocyanate group include —OH, —NH$_2$, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; oxyalkylated amines and polyamines, as well as mixtures thereof. Compounds which contain two or more different groups within the above-defined classes may also be used in accordance with the process of the present invention such as, for example, amino alcohols which contain an amino group and an hydroxyl group, amino alcohols which contain two amine groups and one hydroxyl group and the like. Also, compounds may be used which contain one —SH group and one —OH group or two —OH groups and one —SH group as well as those which contain an amino group and a —SH group and the like.

The molecular weight of the organic compound containing at least two active hydrogen containing groups may vary widely. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as, for example, those obtained from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethyl succinic acid, isophthalic acid, terephthalic acid, hemimellitic acid, trimellitic acid, trimesic acid, mellophanic acid, prehntic acid, pyromellitic acid, benzenepentacarboxylic acid, 1,4-cyclohexanedicarboxylic acid, 3,4,9,10-perylenetetracarboxylic acid, chlorinated acids and anhydrides, and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylolpropane, 1,3,6-hexane triol, triethanol amine, pentaerythritol, sorbitol and the like.

Any suitable polyhydric polyalkylene ether may be used such as, for example, the condensation product of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylolpropane, pentaerythritol, and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, Volume 7, pages 257 to 262, published by Interscienece Publishers, Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patent 2,862,972 and 2,900,368.

The hydroxyl polyester may also be a polyester amide such as is obtained for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable organic polyisocyanate may be used such as, for example, aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, n-butylene diisocyanate, hexamethylene diisocyanate, m-xylylene diisocyanate, p-xylylene diisocyanate, 4,4-dimethyl-1,3-xylylene diisocyanate, cyclohexyl-1,4-diisocyanate, dicyclohexylmethane-4,4'-diisocyanate, m-phenylene diisocyanate, p-phenylene diisocyanate, 3-(alpha-isocyanatoethyl)-phenyl isocyanate, 2,6-diethyl-benzene-1,4-diisocyanate, diphenyl - dimethylmethane-4,4'-diisocyanate, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-naphthylene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthylene diisocyanate, p,p',p''-triisocyanato phenyl phosphate and the like.

It is preferred to use polyaryl alkylene polyisocyanates. The preferred polyaryl alkylene polyisocyanates for use in the invention have the formula:

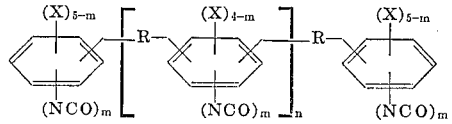

in which R is an organic radical and preferably an aliphatic radical obtained by removing the carbonyl oxygen from an aldehyde or ketone and is preferably —CH$_2$—, $m$ is 1 or 2, X is halogen, lower alkyl or hydrogen and $n$ is 0, 1, 2 or 3. The aliphatic radical, R, in the foregoing formula may be obtained by removing the carbonyl oxygen from any suitable aldehyde or ketone such as, formaldehyde, acetaldehyde, propionaldehyde, butyraldehyde, N-heptaldehyde, benzaldehyde, cyclohexane aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. To illustrate, if one removes the carbonyl oxygen from formaldehyde, H$_2$C=O, the radical remaining is a methylene radical or from acetone CH$_3$—CO—CH$_3$, the radical remaining is

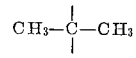

When X is halogen, it may be any suitable halogen, but is preferably chlorine or bromine and further, it is preferred that the amount of chlorine or bromine fall between about one percent and fifteen percent by weight of the compound. When X is lower alkyl, it is most preferably methyl or ethyl but other lower alkyl radicals such as propyl, butyl and the like may be the radical, X. The polyaryl alkylene polyisocyanates of the invention are preferably mixtures of di- and higher polyisocyanates. Thus, $n$ in the formula preferably has a value of from about 0.1 to about 1.5. To illustrate, in a mixture of isocyanates of the above formula containing 90 percent diisocyanate and 10 percent triisocyanate, $n$ would have a value of 0.1. For a mixture containing 20 percent di-, 30 percent tri-, 30 percent tetra- and 20 percent pentaisocyanate, the average value of $n$ would be 1.5. A most preferred value for $n$ is between about 0.85 and about 1.1 with about 40 percent to about 60 percent of the mixture of polyisocyanates being a diisocyanate.

Isocyanates of the above formula are well known and available commercially. They may be prepared as disclosed in U.S. Patent 2,683,730. A specific isocyanate suitable for use in accordance with the present invention may be obtained by reacting about 60 parts of aniline with about 25 parts of formaldehyde (aqueous, 37 percent CH$_2$O) and about 74 parts of HCl (aqueous, 30 percent HCl) at a temperature of about 90° C. to about 100° C. for about 1.5 to about 2 hours and then reacting this product with NaOH and separating out the crude amine. About 100 parts of phosgene are then reacted with the resulting amine until a product having an amine equivalent of about 135 and containing about 31 percent free —NCO is obtained. The free excess phosgene and substantially all of the solvents used, if any, are then removed.

The commercially available polyphenyl methane polyisocyanates are particularly adapted for use in the present invention. The best products have 40 percent to 60 percent 4,4'-diphenyl methane diisocyanate, an amine equivalent of about 125 to about 140, about 0.04 to about 0.4 percent by weight hydrolyzable chloride, about 0.1 to about 0.6 percent by weight total chloride and having a flash point of about 400° F.

It is often advantageous in the production of cellular polyurethane plastics to include other additives in the reaction mixture such as, for example, emulsifiers, coloring agents, fillers and the like. It is particularly advantageous to employ an emulsifier such as, for example, sulphonated castor oil and/or a foam stabilizer such as a silicone oil such as, for example, a polydimethyl siloxane or a polysiloxane polyoxyalkylene block copolymer. The latter type of silicone oil is disclosed in U.S. Patent 2,834,748. Where polyhydric polyalkylene ethers are included in the raction mixture to prepare a cellular polyurethane plastic, it is preferred to employ a silicone oil of the above patent within the scope of the formula

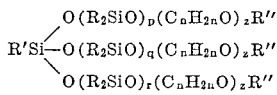

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units from 11 to 15 oxypropylene units with $z$ equal to from about 26 to about 34. Most preferred is a compound having the formula

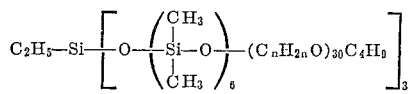

wherein $(C_nH_{2n}O)$ is a mixed polyoxyethylene and oxypropylene block copolymer containing about 17 oxyethylene units and about 13 oxypropylene units.

It is preferred to use a catalyst in the preparation of the polyurethane foam of the invention. Suitable catalysts are, for example, tertiary amines, such as, for example, triethylene diamine, N-methyl morpholine, N-ethyl morpholine, diethyl ethanolamine, N-coco morpholine, 1-methyl-4-dimethylaminoethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, permethylated diethylene triamine and the like. Other suitable catalysts are, for example, tin compounds such as stannous chloride, tin salts of carboxylic acids, such as dibutyl tin-di-2-ethyl hexoate, stannous octoate, stannous oleate, as well as other organo metallic compounds such as are disclosed in U.S. Patent 2,846,408.

The polyurethane foam of the invention is useful for the production of various articles of commerce including foamed insulation such as sound and thermal insulation in the production of wall panels and the like. Moreover, the flexible plastics of the invention may be used for the preparation of cushions, air filters and the like.

The invention is further illustrated by the following examples in which parts are by weight unless otherwise specified.

Example 1

About 100 parts of No. 2 size vermiculite is soaked in a solution prepared from about 200 parts of ammonium phosphate and about 100 parts of water. After about 96 hours at room temperature, the impregnated vermiculite was filtered to remove excess solution and was then dried for about 44 hours at about 80° C. and for about 4 hours at about 120° C. About 189.5 parts of the ammonium phosphate impregnated vermiculite was obtained. This granular material was spread on the surface of an expanding rigid urethane foam prepared as follows. About 70 parts of a methylglucoside propylene oxide adduct having a hydroxyl number of about 460 are mixed with about 30 parts of diethyl-N,N-bis(2-hydroxy-ethyl) amino methyl phosphate, about 30 parts of trichlorofluoromethane, about 1 part of siloxane oxalkylene copolymer having the formula

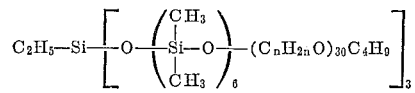

about 1.5 parts of N,N,N',N'-tetra methyl butane-1,4-diamine and about 108 parts of a mixture of organic polyisocyanates having the general formula

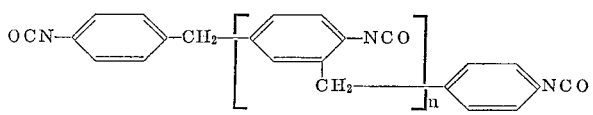

wherein $n$ has an average value of about 0.88, are mixed on a machine mixer as disclosed in U.S. Reissue Patent 24,514 and placed in a cardboard mold. The surface burning of this foam was markedly reduced from that of the same foam prepared without the addition of impregnated vermiculite. Moreover, the combination of the impregnated vermiculite and of the carbonaceous char formed by degradation of the foam surface, produced a continuous stable protective layer on the foam surface.

Example 2

Example 1 is repeated using impregnated vermiculite prepared by soaking about 100 parts of No. 2 expanded vermiculite in a saturated solution of ammonium phosphate in water. The impregnated product was filtered and dried as in Example 1. Foam samples prepared from the formulation and in the manner given in Example 1 showed even less surface burning than the Example 1 foams.

Example 3

Example 1 is repeated using a porous aluminum-magnesium-iron silicate having a particle size in the range of 0.02–0.1 inch and sold under the tradename Speedi-Dri. Foam samples showed very little burn beneath the surface.

The foregoing examples are given for the purpose of illustrating the invention. Any other suitable filler, potentially intumescent material, polyurethane component or the like could be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyurethane foam containing a flame resistant porous filler coated selected from the group consisting of expanded vermiculite, foamed glass, foamed clay or phenolic foam which has been coated with an intumescent material which will intumesce to form a stable char when subjected to intense heat.

2. The polyurethane foam of claim 1, wherein said particles of flame resistant porous filler are spaced apart a distance slightly less than the thickness of the intumesced coating.

3. The polyurethane foam of claim 1 wherein said filler is expanded vermiculite.

4. The polyurethane foam of claim 1 wherein the filler comprises particles of expanded vermiculite coated with ammonium phosphate embedded on the surface of the foam and extending to about one to two inches below the surface of the foam, the proportion of filler in said foam being such that the space between the filler particles is slightly less than the thickness of the char and intumesced coating resulting when the surface is subjected to a flame, said space between the filler particles being a maximum of from about 0.02 to about 0.2 inch, whereby pores at the surface of said filler are substantially occluded with resultant minimal absorption of liquid foam components.

5. A polyurethane foam containing expanded vermiculite having a bulk density below about 20 pounds per cubic foot which has been coated with an intumescent material that will form a stable char in intense heat.

6. The polyurethane foam of claim 5 wherein said intumescent material is ammonium phosphate.

7. The polyurethane foam of claim 5 wherein said expanded vermiculite is coated with ammonium phosphate and is embedded on the surface of the foam and extends at least from about 1 to about 2 inches below the surface of the foam, the proportion of filler in said foam being such that the space between the filler particles is slightly less than the thickness of the char from the intumesced coating resulting when the surface is subjected to a flame, said space between the filler particles being a maximum of from about 0.02 to about 0.2 inch, whereby pores at the surface of said filler are substantially occluded with resultant minimal absorption of liquid foam components.

8. The polyurethane foam of claim 1 wherein said porous filler has a bulk density in the range of from about 1.5 to about 10 pounds per cubic foot.

References Cited

UNITED STATES PATENTS

| | | | |
|---|---|---|---|
| 3,269,989 | 8/1966 | Rayner et al. | 260—75 |
| 3,243,388 | 3/1966 | Ulfstedt | 260—2.5 |
| 3,256,218 | 6/1966 | Knox | 260—2.5 |
| 3,262,894 | 7/1966 | Green | 260—2.5 |

FOREIGN PATENTS 705,937  3/1935  Great Britain.

DONALD E. CZAJA, Primary Examiner

MICHAEL B. FEIN, Assistant Examiner

U.S. Cl. X.R.

106—15; 252—8.1, 378; 260—37, 40